United States Patent
Helfer et al.

[15] 3,635,323
[45] Jan. 18, 1972

[54] WORK HOLDERS FOR USE WITH APPARATUS FOR TRANSFERRING WORK BLANKS AND WORKPIECES IN BEVEL-GEAR-MAKING MACHINES

[72] Inventors: Lawrence R. Helfer, Macedon; Ernst J. Hunkeler, Fairport, both of N.Y.

[73] Assignee: The Gleason Works, Rochester, N.Y.

[22] Filed: Feb. 24, 1970

[21] Appl. No.: 13,423

Related U.S. Application Data

[62] Division of Ser. No. 764,219, Oct. 1, 1968, Pat. No. 3,541,921.

[52] U.S. Cl. ................................................198/33, 279/89
[51] Int. Cl. .....................................B65g 47/24, B23g 5/22
[58] Field of Search ....................198/33, 19; 279/89, 90, 91, 279/106

[56] References Cited

UNITED STATES PATENTS

| | | | |
|---|---|---|---|
| 2,865,643 | 12/1958 | Parker et al. | 279/106 |
| 2,212,406 | 8/1940 | Rusnak | 279/91 |
| 2,922,657 | 1/1960 | Garrison et al. | 279/106 |

FOREIGN PATENTS OR APPLICATIONS

| | | | |
|---|---|---|---|
| 1,065,095 | 4/1967 | Great Britain | 279/106 |

*Primary Examiner*—Richard E. Aegerter
*Assistant Examiner*—Hadd S. Lane
*Attorney*—Morton A. Polster

[57] ABSTRACT

Work-holding devices for use with work loading and transferring apparatus for automatically handling and moving gear blanks and gear pieces from one station to another relative to gear-cutting machines. The work-holding devices, which are positioned at the ends of loading and transfer arms, each include a cup means for contacting and centering a gear piece relative to the holding device, and jaw members for effecting a tight grip on the workpiece. These different embodiments of the workholder device are disclosed, namely, (H-1) a basic device for handling work blanks which have not been cut at all, (H-2) a device similar to H-1 but including stock-dividing means suitable for orienting a rough cut workpiece for a further cutting operation, and (H-3) a device similar to H-2 but including a different form of stock-dividing means for orienting a workpiece between two finish-cutting operations.

7 Claims, 16 Drawing Figures

LAWRENCE R. HELFER
ERNST J. HUNKELER

INVENTORS

BY Morton A. Polster

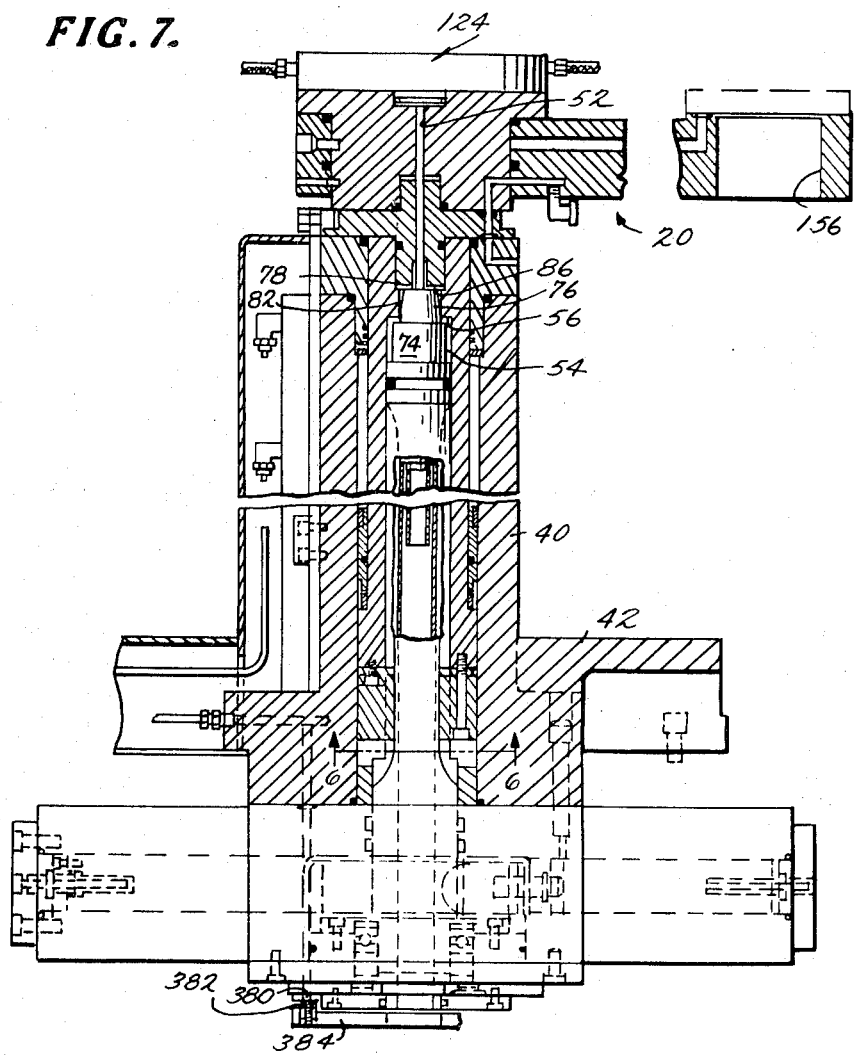
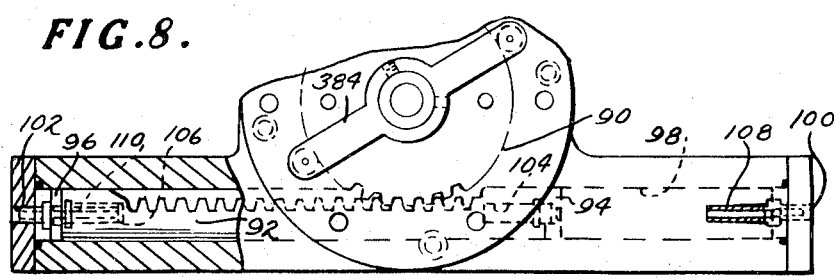

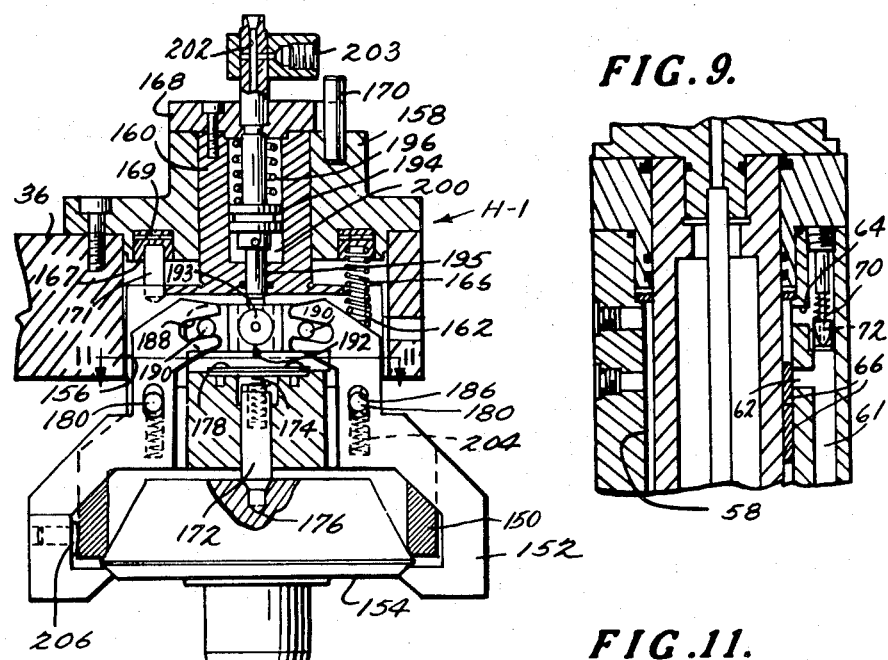
FIG. 9.
FIG. 10.
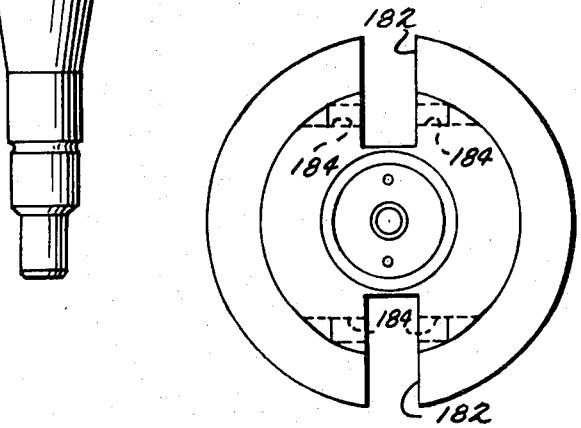
FIG. 11.

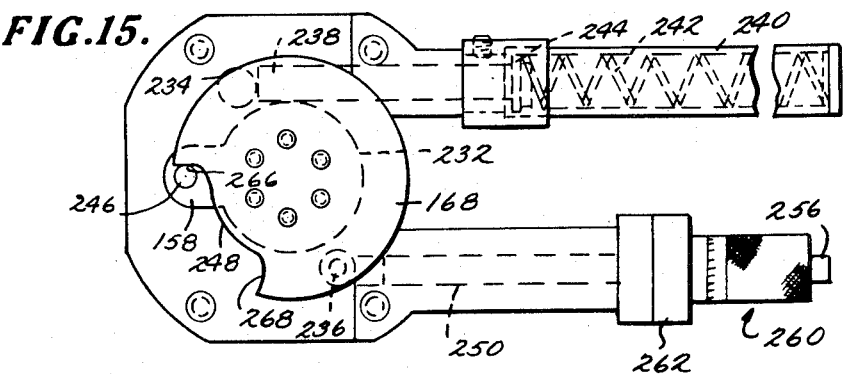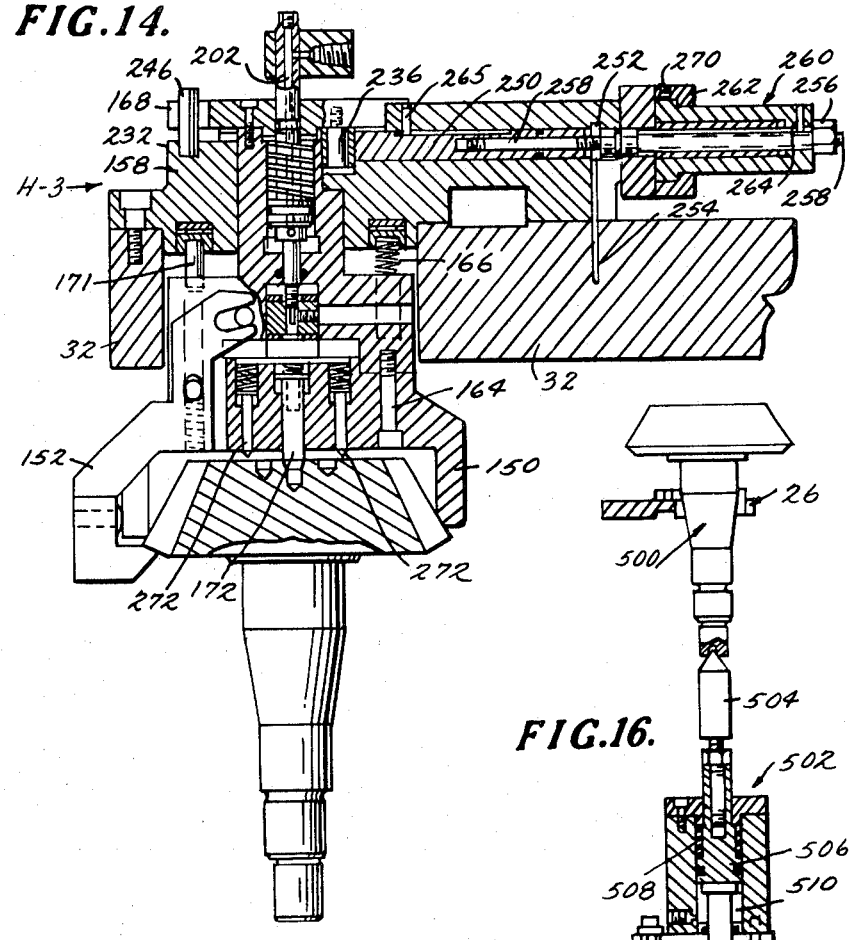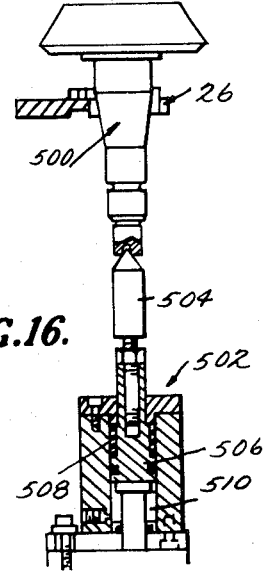

WORK HOLDERS FOR USE WITH APPARATUS FOR TRANSFERRING WORK BLANKS AND WORKPIECES IN BEVEL-GEAR-MAKING MACHINES

This is a division of application Ser. No. 764,219, filed Oct. 1, 1968 now U.S. Pat. No. 3,541,921.

This invention relates to improvements in apparatus and systems for loading, handling, and transferring workpieces from one station to another relative to machines which can perform a series of sequential operations on the workpieces.

In particular, the invention is concerned with a work loader and transfer arrangement for bevel-gear-cutting machines of the type where two or more work stations are provided for roughing or finishing work blanks and workpieces. The work loader arrangement includes a device which can load workpieces into and out of work stations of a gear-cutting machine, and the device includes means for transferring the same workpieces from one station to the next in machines which involve more than one cutting operation. The work loading and transferring arrangement of this invention provides for a novel method of processing workpieces from a source and through a series of cutting operations.

Generally, it is known in this art to provide for some means of transferring gear blanks and gear pieces from one station to another in gear-cutting apparatus. Typical prior art arrangements for handling work in such machines is disclosed in U.S. Pat. Nos. 2,773,426; 2,782,689; 3,169,446; 3,229,585; and 3,354,782. However, for one reason or another, such work-handling systems have not become accepted in the industry of spiral bevel and hypoid pinions to any great extent, and the present invention is concerned with solving problems involved in handling workpieces of a shape and size typically encountered in bevel gear-cutting operations. Because of the irregular shape of a bevel gear blank and because of a need for very precise placement of such a blank relative to a gear-cutting machine, it has been difficult to provide an arrangement which will automatically load and unload such pieces into and out of a gear-cutting machine. The problems of handling and placement are compounded even more where more than one gear-cutting machine is involved and the present invention directs itself to improvements which permit a reliable and precise handling of such workpieces in high-speed gear-cutting machines which may include more than one cutting station. The types of machines contemplated by the present invention are concerned with automatically cutting hypoid pinions, at high speeds and with great precision, for use in automotive drive trains.

These and other features of the invention will be discussed in greater detail below, and in that discussion reference will be made to the accompanying drawings in which:

FIG. 7 is an elevational view similar to that shown for FIG. 5 but angularly displaced 90° around the vertical longitudinal axis of the turret assembly;

FIG. 8 is a plan view in partial cross section to illustrate a means for oscillating the turret back and forth around its central longitudinal axis;

FIG. 9 is an elevational cross-sectional view of an upper portion of the turret assembly, illustrating details of dash pot structures associated with vertical movements of the loader arms relative to the turret;

FIG. 10 is a detailed elevational view in partial cross section of a first type of work-holding means associated with the loader and transfer means of this invention;

FIG. 11 is a cross-sectional view taken on a horizontal plane on line 11—11 of FIG. 10, showing a portion only of the structure of FIG. 10;

FIG. 14 is a vertical elevational view in partial cross section, similar to FIGS. 10 and 12, showing a third type of holding means which may be used with this invention;

FIG. 15 is a plan view of a portion of the holding means of FIG. 14, showing an indexing system which provides for automatic stock division when a workpiece is transferred from one station to another; and FIG. 16 is an elevational view in partial cross section of a mechanism associated with a conveyor for handling workpieces.

Figure 1:
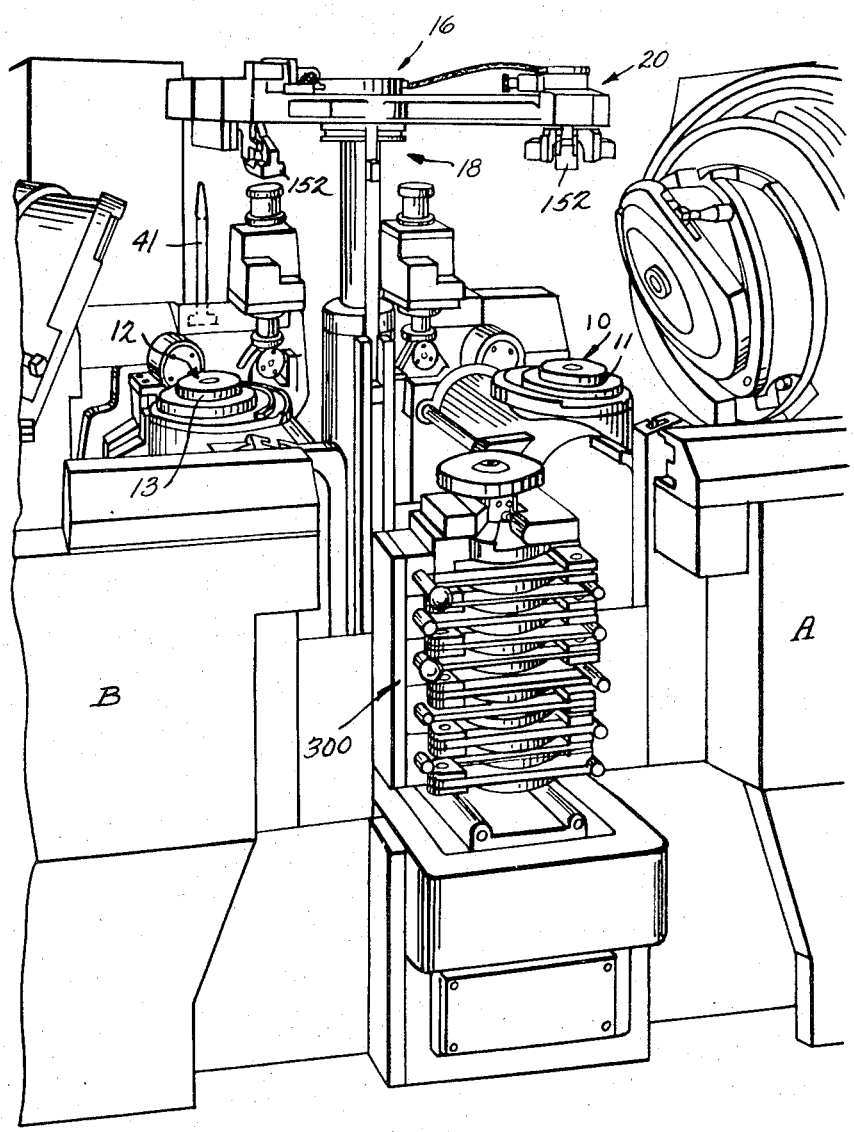
FIG. 1 is a perspective view of a dual bevel-gear-cutting machine having two cutting stations between which gear blanks can be moved for separate cutting operations, and this figure illustrates a work loader and transfer means, together with a control system for such means, in a machine of this type.

Referring to FIG. 1, a dual gear-cutting machine is shown in perspective view in a typical manufacturing setup for producing hypoid pinion gears. The dual machine includes a first work station 10 and a second work station 12 at which pinion gear pieces can be received in work spindles 11 and 13 associated with the work stations. The means for holding workpieces in place at the stations may include well-known mechanisms for chucking and dechucking a workpiece as well as means for moving the entire work spindle assembly into a proper position for engagement of cutters 14 with each of the workpieces. Between the two work stations is positioned a work loader and transfer means 16 which functions to automatically load workpieces into and out of each of the work stations 10 and 12 and to transfer workpieces between those stations as well as between the dual gear-cutting machine and a conveyor or other source of supply. The loader and transfer means 16 includes a turret assembly 18 which can be lifted and lowered to raise and drop workpieces at the separate stations in accordance with a precise sequence of operations. In addition, the turret assembly 18 can be rotated about its own vertical axis so as to move arm members, generally indicated at 20, back and forth between the work stations. FIG. 1 also illustrates the control cam apparatus 300 which automatically controls and sequences the series of operations performed by the dual gear-cutting machine.

Figure 2:
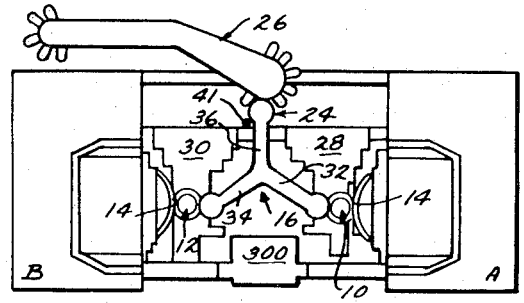
FIG. 2 is a plan schematic view of a bevel gear cutting arrangement involving a transfer of work between three separate stations which include two gear-cutting stations and one station supplied by a conveyor.
Figure 3:
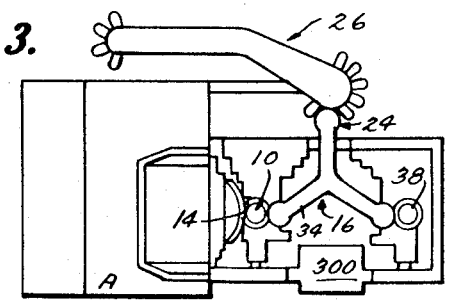
FIG. 3 is a view similar to FIG. 2 showing a work loader arrangement which operates between three stations which include only a single gear-cutting station.

FIGS. 2 and 3 illustrate typical layouts for utilizing the loader and transfer means of the present invention between two or more stations. In the FIG. 2 arrangement, two machines A and B are related to one another, as in FIG. 1, to form a dual cutting machine which may comprise two rougher machines, two finisher machines, or a rougher and finisher combination. The machines A and B have work-cutting stations 10 and 12 respectively, and the loader and transfer means 16 is positioned to operate between the two stations 10 and 12. In addition, a third station 24 is provided as a point for receiving new work blanks and as a place for returning finished workpieces. The third station 24 may receive work blanks from a conveyor means 26 which advances a new work blank to the station 24 before each transfer cycle. The same conveyor 26 can receive finished pieces which are transferred from station 12 at the end of each cutting cycle to station 24. It can be seen that each of the work stations 10 and 12 correspond to conventional positions for holding workpieces while a cutting operation is performed by rotating cutting means. The work stations are typically in the form of work spindles held in assemblies 28 and 30 which can be moved relative to the cutting means 14. Means for moving the work head assemblies 28 and 30 are not a separate part of this invention, but generally, means are provided for rocking each of the assemblies 28 and 30 from cutting positions, as related to the cutting machines A and B, to work transfer positions which would place the stations 10 and 12 directly beneath work holders carried by separate arms 32 and 34 of the work loader and transfer means. The work loader and transfer means 16 is oscillated back and forth about the vertical axis of its turret 18 so that arm 32 passes only between stations 10 and 12 and arm 34 passes only between stations 12 and 24. The third arm 36 passes only between the conveyor station at 24 and the first work-cutting station 10. Thus, the separate arms 32, 34 and 36 can be provided with different types of work-holding means having somewhat different structures and functions for handling workpieces at varying stages of completeness.

FIG. 3 is a view similar to FIG. 2 and shows the use of the loader and transfer means of this invention with a single gear-cutting machine A. In this arrangement, only a single cutting station 10 is available to each workpiece, but a dummy, or banking, station 38 may be provided for holding workpieces until they can be advanced to the cutting station 10. After a cutting operation has been completed at 10, the workpiece is moved by the arm 34 to the conveyor 26 to be received and carried away. Thus, even in the case of a single machine operation, the loader and transfer means of this invention provides for an automatic handling of workpieces from a source of supply, through a cutting operation, and to a point where they can be delivered away from the cutting machines.

Figure 4:
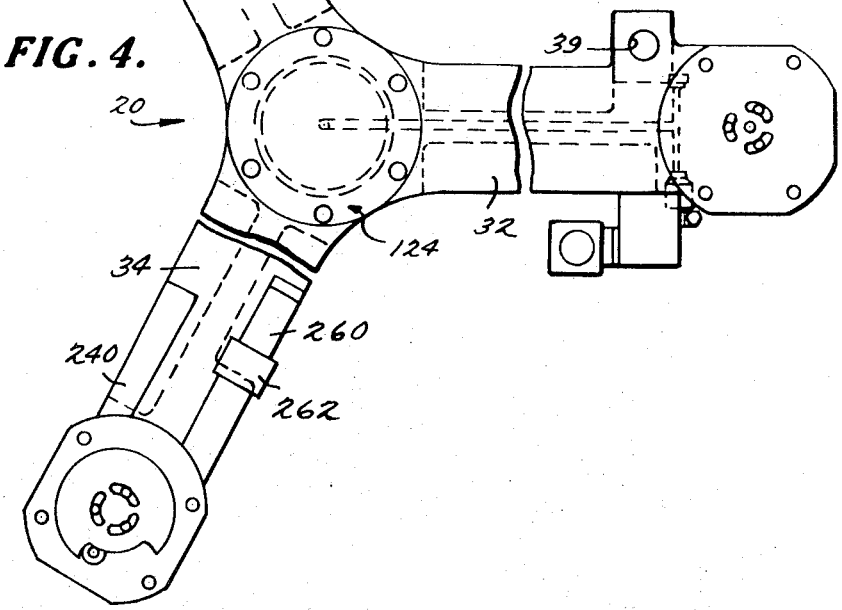
FIG. 4 is a plan view of radially disposed arm structures associated with the loader and transfer means of this invention.

FIGS. 4 through 8 illustrate details of construction of the work loader and transfer means 16. As shown in FIG. 4, separate arms 32, 34 and 36 are arranged 120° apart about a vertical central axis of the loader, and means are provided for attaching holding means to terminal end portions of the separate arms. Guide elements 39 may be provided on one or more of the arms to align the arms with an upstanding guide pin 41 (FIG. 1) fixed to a base or frame portion of the machine on which the loader is carried. The guide pin 41 assures correct alignment of the loader 16 with separate work stations while the loader is being moved up and down to pick up or release workpieces.

Figures 5, 6:
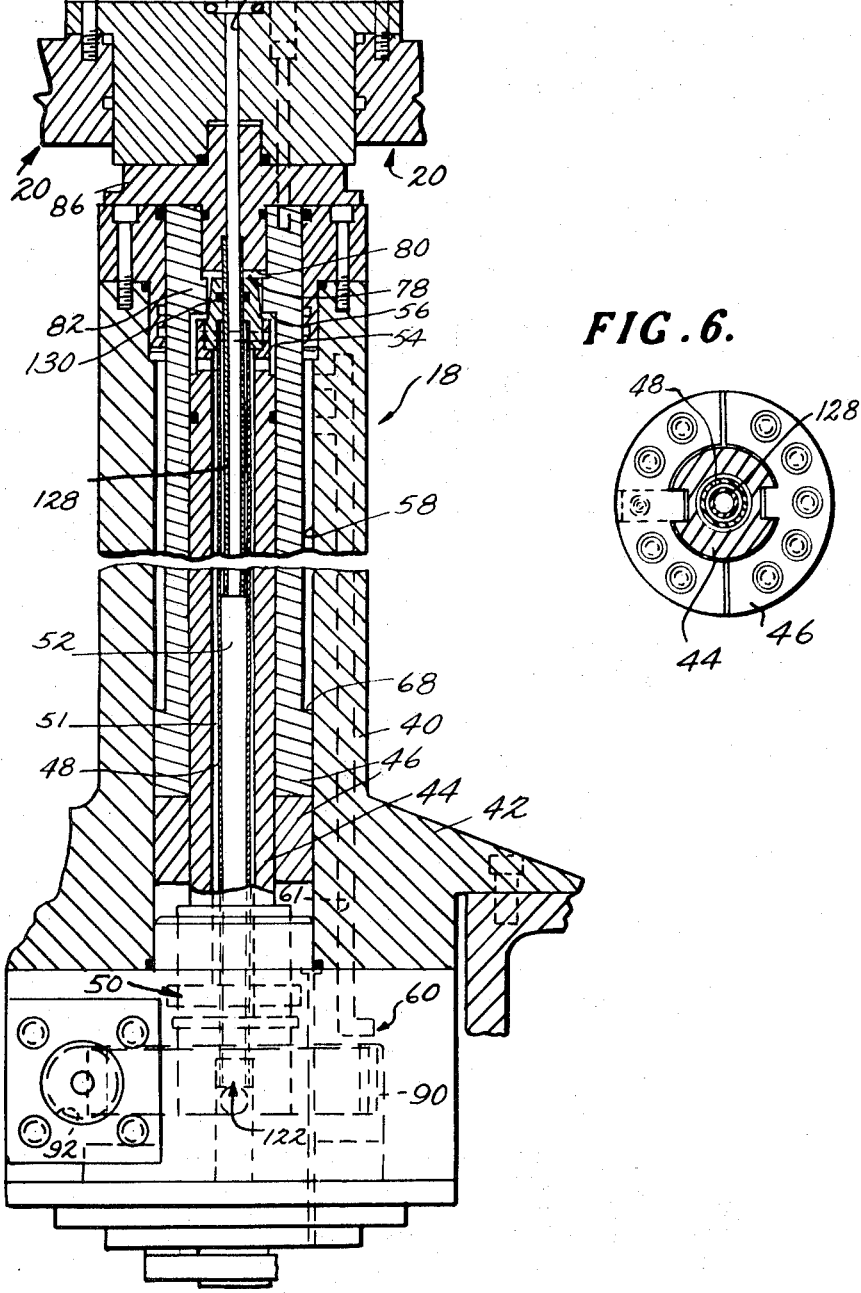
FIG. 5 is an elevational view, partly in cross section, illustrating a turret assembly associated with the work loader and transfer means of this invention.
FIG. 6 is a cross-sectional view of the turret assembly of FIG. 7 as seen on line 6—6 of FIG. 7.

As seen in FIGS. 5-7, the turret assembly of the machine includes an outer cylindrical casing 40 which is affixed to a portion of the frame of a machine with which it is associated. As shown in FIG. 5, the casing 40 includes an integral base portion 42 which can be bolted to any convenient part of a machine base or frame. The casing 40 functions as a support for mechanisms which lift and lower and rotate the loader and transfer means. Concentrically positioned within a bore formed in the casing 40 are a drive shaft 44 and a lifting and lowering shaft 46. The drive shaft 44 functions to rotate the loader arms 20 back and forth about the central vertical axis of the turret 18, and the lifting and lowering shaft 46 includes a piston means to lift and lower the loader and transfer means in response to fluid pressure applied to the piston means. The drive shaft 44 and the lifting and lowering shaft 46 are tubular in construction so that they can be mounted concentrically relative to one another and to the turret tube 40. The drive shaft 44 includes a central bore which is divided into two fluid chambers by a tubular element 48. The tubular element 48 is spaced inwardly from the surface of the central bore of the drive shaft 44 so that hydraulic fluid can be admitted through an inlet 50 into an annular passageway 51 which is formed around the tubular element 48.

A separate chamber 52 is defined by a bore through the tubular element 48, and this chamber is sealed from the annular passageway 51 around the element 48. The central chamber 52 receives a supply of hydraulic fluid from a separate source for ultimate use in activating holder means associated with the arms of the loader and transfer means. The flow of hydraulic fluid into the inlet 50 and around the tubular element 48 through passage 51 serves a purpose of lifting the loader and transfer means by an application of fluid pressure into a chamber 54 communicating with the annular passage 51 associated with inlet 50.

Considering the lifting and lowering system for the loader and transfer means, hydraulic fluid is admitted into the inlet 50 and through the passageway 51 for applying a pressure to an upper piston portion of the shaft 46. As shown in FIGS. 5 and 7, fluid which is introduced into the inlet 50 rises upwardly through annular passageway 51 of the turret assembly until it enters the chamber 54. Fluid pressure in the chamber 54 initially acts against a surface 56 which is formed on the lifting and lowering shaft 46, and this applies a lifting force to the shaft 46 and all associated parts as related to the fixed position of the inner drive shaft 44. A separate fluid chamber 58 is provided around the shaft 46 for driving the shaft downwardly with a separate fluid supply which is admitted at 60.

When the turret assembly is being lifted, hydraulic fluid is admitted into the inlet 50 and fluid is exhausted from the annular chamber 58 by a reverse flow out of its inlet 60. The reverse takes place when the turret assembly is lowered inasmuch as hydraulic fluid is admitted into the inlet 60 and its associated annular chamber 58 while fluid is allowed to flow out of the chamber 54 and its associated inlet 50. Thus, the inlets 50 and 60 function as both inlets and outlets at different times of a lifting and lowering cycle. The means for admitting hydraulic fluid into either of the inlets 50 or 60 comprises conventional arrangements which include a source of hydraulic fluid, pumping means, and valving means for controlling direction of flow. A control means, comprising a plurality of revolving cam disks 300 (FIG. 1) sequences the flow of hydraulic fluid into and out of the loader 16.

In addition to providing for a lifting and lowering of the loader and transfer means in response to application of hydraulic fluid, means are provided for dampening the lifting and lowering movements when they reach their upper and lower limit positions. For example, when the turret assembly is lifted by an admission of hydraulic fluid into the inlet 50, there would be an abrupt stopping of the turret upon reaching its uppermost position if means were not provided for dampening its upward movement.

The means for slowing the upward movement of the shaft 46 near its upper limit is shown in greater detail in FIG. 9. When the tubular shaft 46 is initially lifted, it is necessary that hydraulic fluid contained within the annular chamber 58 be allowed to escape from that chamber. However, hydraulic fluid can flow out of the chamber 58 only at an upper level of the chamber through a main outlet 62 or an alternate outlet 64. The outlet 62 is unrestricted and allows a free flow of hydraulic fluid out of the annular chamber 58 downwardly through the passageway 61 associated with the inlet 60 of the chamber 58. However, spacer elements in the form of sleeves 66 which can be contained within the annular chamber 58 are carried upwardly with the upward movement of the shaft 46 because the spacer elements 66 rest on an enlarged portion of the shaft 46 at 68 (FIG. 5). As the shaft 46 reaches its upper limit of travel, the spacer elements 66 block the free-flowing passageway 62, and this forces all remaining fluid in the chamber 58 to escape through the alternate passage 64. The alternate passage includes a restrictor valve 70 therein for restricting the flow of fluid downwardly through the valve and into the passageway 61. The restricting function of the valve 70 is provided by a very small bore 72 which limits the flow of fluid downwardly through the valve body. This restriction of flow of fluid substantially retards the final upward movement of the shaft 46 since hydraulic fluid cannot escape from the chamber 58 rapidly enough to allow continued rapid upward movement of the shaft 46. Thus, by the time the shaft 46 reaches its uppermost position, it has been dampened in its rate of travel by the dampening means just discussed.

When it is desired to lower the turret assembly, hydraulic fluid is admitted into the inlet 60 and its passageway 61 for a pressurized flow into the chamber 58. Inward flow of hydraulic fluid through the passageway 61 initially passes through the restrictor valve 70 in a reverse direction from what was discussed above, and it can be seen that the valve body can be displaced from its seated position for this reverse flow. This allows an easy admission of hydraulic fluid through the passageway 64 and into an uppermost part of the annular chamber 58, to initiate downward movement of the shaft 46. Of course, once the spacer elements have moved downwardly enough to open the passageway 62, the inward flow of fluid can also travel through that passageway.

Initial downward movement of the turret assembly is also assisted by the weight of the loader and the arm elements carried by the shafts 46 and by a release of fluid pressure from the annular passageway 51 associated with the inlet 50. However, it is desirable to provide a positive downward displacement of the shaft 46 in order to rapidly and precisely move the transfer and loader means to its lowermost position, and therefore, hydraulic fluid is admitted into the chamber 58 for applying a downward pressure on the enlarged portion 68 of the lifting and lowering shaft 46.

When the lifting and lowering shaft 46 approaches its lowermost limit, it is desirable to dampen the final movement of the shaft so as to cushion the lower limit stopping of the loader and transfer means. This dampening function is performed by a dash pot arrangement provided above the chamber 54. As shown in FIGS. 5 and 7, the chamber 54 is defined in part by a reduced cylindrical end portion 74 of the central drive shaft tube 44. This reduced end portion 74 remains fixed to the drive shaft 44 and does not lift and lower with the movements of the surrounding shaft 46. A further reduced end portion 76 is affixed to the end 74 so that when shaft 46 is lifted, the reduced end portion 76 remains at a fixed level. This means that hydraulic fluid which is admitted into the chamber 54 also flows past the reduced end portion 76 and into an upper chamber 78 so as to ultimately apply additional lifting force against the surface 80. Once the shaft 46 is at a sufficiently high level to provide wide clearance between the reduced end portion 76 and a corresponding reduced bore portion of the shaft 46, there is any easy flow of hydraulic fluid upwardly into the chamber 78.

As shown in FIGS. 5 and 7, the reduced end portion 76 is tapered slightly so that it is of a smaller diameter at its upper level than it is at a lower level. This arrangement provides a varying striction of flow of hydraulic fluid out of the upper chamber 78 when the shaft 46 is being moved downwardly. The shaft 46 includes an upper section 82 having a reduced diameter bore for receiving the reduced end portion 76. As the shaft 46 is lowered to its lowermost position, the bore portion of 82 approaches the upper end of the reduced end portion 76. At this point, there is a restriction of flow of hydraulic fluid out of the upper chamber 78 because it must escape past the end portion 76 in order to find its way downwardly into the chamber 54 and ultimately through the annular passageway 51. Thus there is an initial dampening of the downward movement as soon as any part of the portion 82 approaches the reduced end portion 76. However, the dampening effect is increased because of the tapered configuration of the end portion 76, and it can be seen that as more and more of the end portion 76 is received into the bore of portion 82, there is more and more restriction of flow of fluid past the reduced end portion 76. This restriction takes place when the loader and transfer means is near its lower limit position. Thus, there is provided a means for dampening both upper and lower limits of movement for the turret assembly.

As discussed above, the central drive shaft 44 does not raise and lower with the raising and lowering of shaft element 46. The central drive shaft 44 functions only to oscillate the loader and transfer means about a central vertical axis of the turret assembly, and this is accomplished by drive means included in the base of the turret assembly, as shown in greater detail in FIGS. 7 and 8. Rotational movements which are applied to the drive shaft 44 are imparted to the lifting and lowering shaft 46 because the two shafts are keyed together as shown in FIG. 6. This arrangement permits both shafts to be rotated but only the outer shaft 46 can be lifted and lowered. Of course, the outer shaft 46 carries all of the upper assembly elements which include the arms 20 and elements associated with the gripping and handling of workpieces as carried by the arms. All of the upper elements of the loader transfer means are bolted, or otherwise secured, to the shaft 46 by way of a plate member 86. The plate member 86 is lifted and lowered and rotated with all movements of the shaft 46.

Considering the means for rotating the drive shaft 44, reference is made to the details of FIGS. 7 and 8 wherein a rack and pinion drive arrangement is illustrated. A pinion gear 90 is affixed to a lower end of the drive shaft 44 in any well-known manner so that rotational movements which are applied to the pinion gear 90 will be imparted to the drive shaft 44. A rack 92 is provided for precisely moving the pinion 90 back and forth about a central vertical axis of the turret assembly. The rack 92 is operated by a fluid pressure system which involves the alternate admission of hydraulic fluid to opposite ends of the rack 92. As shown in the drawings, the rack 92 includes cylindrical end portions 94 and 96 which are fitted within a cylindrical chamber 98 formed within the base assembly of the turret assembly. The cylindrical end portions 94 and 96 function as pistons within the bore 98, and the admission of hydraulic fluid into either of the inlets 100 or 102 will function to drive the rack in one direction or the other, depending upon which inlet is receiving hydraulic fluid.

A control system may be provided for supplying hydraulic fluid under pressure to the inlets 100 and 102 in an alternating sequence and at desired times, and means for pumping and controlling the direction of flow of hydraulic fluid from a source are well known in this art and do not form a separate part of this invention. In order to provide a dampening of the rack 92 at its two limit positions at opposite ends of the bore 98, the inlets 100 and 102 are of a special configuration to extend into the bore 98 for sufficient distances to be received within small diameter bores 104 and 106 provided in the cylindrical end portions 94 and 96 of the rack assembly. The inlets 100 and 102 are preferably in the form of tapered tubular elements 108 and 110 which provide a dash pot arrangement at each end of the rack 92 when the tapered elements 108 and 110 are received in their respective bores 104 and 106.

It can be seen that when the rack is moved one way or the other, it is necessary to admit hydraulic fluid against one of the pistons 94 and 96 while at the same time releasing hydraulic fluid from an opposite end of the rack 92. The release of hydraulic fluid takes place by a reverse flow of fluid through one of the inlets 100 or 102, and as the rack reaches a limit position near the inlet from which hydraulic fluid is being released, there is a restriction of the rate of flow of fluid out of the inlet. For example, as the rack 92 approaches a left-hand position, as seen in FIG. 8, the tubular element 110 functions as an outlet for a release of hydraulic fluid from the chamber formed at the end of the assembly. However, as the end of the tubular element 110 is received within the bore 106 of the rack, it is necessary for all fluid to escape out of the chamber by travelling around the end of the tubular element and out through its central bore. Since the tubular element has a tapered configuration, flow of fluid around its outside surface becomes more and more restricted as the rack 92 moves closer and closer to the left-hand position. This provides a hydraulic fluid cushion at the end of the piston 96 which prevents an abrupt stopping of the rack at its limit position. The same action takes place when the rack is reversed for a movement to the right-hand side of FIG. 8. Also, when movement of the rack is initiated in either direction, there is a slower rate of travel at the beginning of each movement until a tubular element has moved completely away from its associated bore.

The discussion so far has been concerned with means for applying lifting, lowering and oscillating rotational movements to the turret assembly 18 which includes the work-handling and transfer arms 20. The arms 20 may comprise specific arms 32, 34 and 36 of the type discussed with reference to FIG. 2, and each of the arms may include a work-holding means for gripping a workpiece while it is being transferred from one station to another. Thus, it is necessary to provide mechanisms and systems for operating the work-holding means associated with each of the arms which are a part of the work-handling and transfer means.

Generally, the work-holding devices are actuated by hydraulic fluid pressure, and the flow of hydraulic fluid is dictated by the same control system which dictates a flow of fluid into inlets 50 and 60 for applying movements to the turret assembly. However, the admission of hydraulic fluid to the work holder devices associated with each of the arms 32 through 36 takes place through the central bore 52 which passes up through the center of the turret assembly. The central bore 52 may have an inlet 122 (FIG. 5), and it can be seen that the bore passes up through the turret assembly to a distributor disc 124 carried at the top of the assembly. From there, hydraulic fluid can flow through separate passageways 126 to the separate arms associated with the loader and transfer means.

Since the turret assembly moves up and down during normal work-handling operations, it is necessary to provide a telescoping feature for the central bore 52 so that hydraulic fluid can be admitted to work-holding devices for all positions of the work transfer and handling means. For this purpose, a separate tubular element 128 is affixed to the element 86 of the assembly so that it will be carried up and down with vertical movements of the assembly. Sealing gaskets 130 allow vertical movements of the tubular element 128 relative to the drive shaft 44 so that no leakage of hydraulic fluid will take place out of the bore 52. Thus, hydraulic fluid can be admitted to the inlet 122 at prescribed times to effect desired actuations of work-holding elements carried near terminal ends of each of the arms associated with the handling and transfer means, and the flow of hydraulic fluid can take place irrespective of the vertical or rotational position of the arms 20.

As mentioned above, each of the arms 20 associated with any given loader and transfer device made in accordance with this invention may include a work-holding device near its terminal end for engaging and gripping a work blank or a workpiece for movement from one station to another. When the work loader and transfer means includes three arms 32, 34 and 36 as shown in FIG. 2, it is possible to provide three different types of work-holding devices for each of the three arms when the work-handling and transfer device is being used in a dual machine having two work stations and a third station which supplies work blanks and receives finished pieces. The following discussion will describe a basic work holder device (H-1) with reference to FIGS. 10 and 11, and modifications of the basic work-holding device will be described with reference to FIGS. 12 through 15.

The FIG. 10 type of work-holding device (H-1) is constructed to handle work blanks which have not been cut at all and which are to be transferred from a conveyor or other supply station to a first cutting station. Also, the basic device of FIG. 10 can be used to move rough cut pinion gear pieces from a conveyor or source of supply to a dummy or banking station of the type shown at 38 in FIG. 3.

Figure 12:
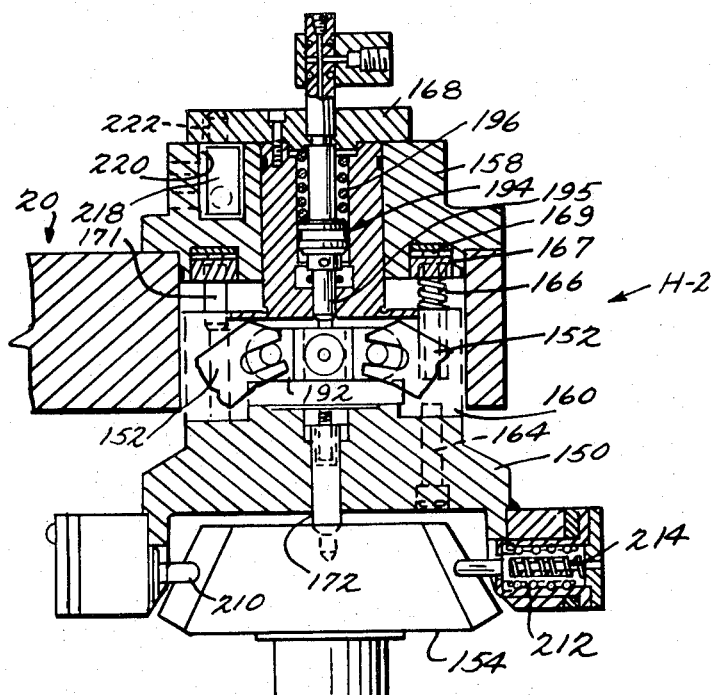
FIG. 12 is a detailed elevational view similar to FIG. 10 but showing a second type of holding means which may be used with the loader and transfer means of this invention.

The second type of work-holding device (H-2) is shown in FIG. 12 and includes means to orient a hypoid pinion gear piece which has been previously rough cut. The orienting means comprise one or more pins which can be inserted into a spiral groove of the gear piece so that axial movement of the work-holding device relative to the gear piece will result in limited rotation of the gear piece. This type of work-holding device is utilized for handling rough cut gear pieces which are to be transferred to a finish cutting station. This transfer may be between a source of supply such as a conveyor and a first finish cutting station or between a dummy station and a single finishing station.

The third type of work-holding device (H-3) as illustrated in FIG. 14, includes means for orienting the workpiece very precisely in its movement from one finish cutting station to a second finish cutting station. This is very important when a hypoid gear piece is being only partly finish cut at one station and completed at a second station because each of the partly finished grooves must be carefully related to the cutter of the second station in order to obtain a precision gear product. The means for orienting the gear piece which are combined with the work-holding device of FIG. 14 provide for a carefully controlled and adjusted orientation of a workpiece between cutting stations.

Referring again to FIG. 10, each of the holding devices which are used with the present invention includes a centering cup means 150 and a pair of jaw members 152. The centering cup means is in the form of a metal cup having a downwardly depending annular lip for contacting the tapered tooth portion of a gear piece, and the centering cup means functions to assist in a precise centering of a gear piece relative to the work-holding means and to provide a continuous surface against which the workpiece may be tightly gripped. The jaw members 152 function to engage a lower surface of heel 154 of the tooth portion of a gear piece and to draw the gear piece into tight engagement with the centering cup means 150. Each of the three forms of work-holding devices which will be discussed includes the basic combination of a centering cup means and jaw members which can be moved relative to the centering cup and to a workpiece which is to be gripped in the work-holding device. Prior arrangements which utilize only jaw structures do not provide a precise and reliable positioning of a gear piece for a transfer between stations, and further, prior arrangements have not been acceptable to high-speed cutting machinery of the type contemplated by this invention because they have not provided for any compensation for the existence of burrs which may develop on the heel portion 154 of a gear piece during normal cutting of the gear piece. The three types of work-holding devices which are presented by this invention provide compensation for the existence of burrs while at the same time providing a tight gripping of a workpiece so that rotation of a workpiece can take place while it is being moved from one station to another.

FIG. 10 shows the basic work-holding device attached to the end of an arm 36 associated with a work-handling and transfer device. The arm 36 may be manufactured from aluminum or an aluminum alloy, and a bore 156 is provided to the arm for allowing vertical movements of the work-holding device relative to the arm. A mounting block 158 is affixed to the arm to carry all elements of the work-holding device. The mounting block 158 has a bore formed through it which acts as a cylinder in which a jaw assembly holder 160 can move up and down. Suitable means may be provided for lubricating the cylindrical surface of the jaw assembly holder 160 for its movement within the mounting block 158. The jaw assembly holder 160 includes an enlarged lower portion 162 which carries the centering cup 150. The centering cup 150 may be secured to the jaw assembly holder by bolts 164 (FIG. 12).

The combined jaw assembly holder 160 and centering cup 150 are resiliently mounted within the support block 158 by a number of spring means 166, which space the jaw assembly holder and centering cup downwardly away from the block 158. Opposite ends of the springs 166 are received into recesses in the support block 158 and in the lower portion 162 of the jaw assembly holder, and the spring means 166 are normally compressed to urge the centering cup 150 downwardly relative to the support block 158.

A recess formed in the support block 158 is in the form of an annular channel which carries an annular ring member 167 for rotational movement relative to the annular channel. Bearing means 169 may be provided between the member 167 and the channel to reduce friction. A dowel 171 may be received in annular ring member 167 so as to rotate the ring member when the jaws are rotated (as in the embodiment of FIGS. 12 and 14) and this prevents the springs from being flexed out.

The lower limit of travel of the jaw assembly holder 160 and its attached centering cup 150 is set by a top plate 168 affixed to the upper end of the jaw assembly holder 160. It can be seen that the top plate 168 is of sufficient size to contact an upper surface of the support block 158 when the centering cup is in its lowermost position. A pin 170 may be fixed into the support block 158 to prevent rotation of the jaw assembly holder and centering cup in the basic holding device of FIG. 10. Thus, the jaw assembly holder and its attached centering cup 150 are normally urged downwardly until the centering cup 150 contacts the outside profile of a gear piece, and then, continued downward movement of the loader turret assembly to which the arm 36 is attached will compress the springs 166 so as to move the centering cup 150 upwardly relative to the support block 158.

The centering cup 150 also includes a centering pin means 172 which is mounted for vertical movement against a spring 174 within a bore formed through the center of the centering cup 150. The centering pin means 172 functions to initially contact a recess formed in the center of a workpiece, and a tapered end 176 of the centering pin means aligns the workpiece with the centering cup means before actual contact of the centering cup with the workpiece takes place. The spring means 174 may comprise a relatively long helical spring which is mounted within a bore formed in the centering pin means, and a plate 178 can be secured to a top surface of the centering cup 150 to hold the spring means 174 in place.

The centering cup means 150 also functions to support a pair of jaw members 152 for movement relative to the workpiece and to the remainder of the work-holder device. Each jaw member 152 is supported on a pin 180 so that it can be rocked about the axis of the pin. FIG. 11 illustrates slots 182 which are formed in the centering cup 150 to receive the downwardly depending jaw members 152, and the pins 180 are fixed relative to the centering cup 150 in bores 184. Each jaw member 152 includes an elongate slot 186 through which the pin 180 passes for supporting the jaw member. The elongate slot 186 functions to permit limited vertical movement of the jaw member relative to its associated pin 180. The two jaw members 152 are mounted so that they can be actuated into engaging and disengaging positions relative to a workpiece. Upper ends of the jaw members 152 include open slots 188 for receiving pins 190 associated with a jaw-actuating mechanism. The pins 190 are carried at the ends of the yoke 192, and are fixed relative to the yoke, so that vertical movements of the yoke transmit rocking movements to the jaw members 152.

Means for vertically moving the yoke includes a piston and rod assembly 194 which is fitted within a cylindrical chamber formed in the upper end of the jaw assembly holder 160. The piston and rod assembly 194 is normally urged downwardly by a spring means 196, and downward movement of the piston 194 to its lowermost position causes the jaw members 152 to be radially opened relative to the centering cup 150. It can be seen that downward movement of the piston and rod 194 moves the yoke means 192 downwardly to rock each of the jaw members 152 about its respective pivot pin 180, and this effects a radially outward movement of the jaw members from the positions shown in FIG. 10.

The piston and rod assembly can be attached to the yoke means 192 in any suitable manner, however, it is preferred that the rod 195 of the piston and rod assembly 194 be secured to the yoke means by a swivel nut assembly 193 which permits limited rocking motion of the yoke means about an axis which is perpendicular to the view shown in FIG. 10. This preferred arrangement allows the yoke means to rock and to effect radial movements of the two jaw members 152 even if one of the jaw members is positioned at a slightly lower position than the other, such as might happen if one of the jaw members engages a burr on the heel of a workpiece. Thus, there is provided a compensation for the existence of burrs on the workpieces, and the compensation does not affect the true centering of the workpiece with the centering cup means 150 and the tight engagement of the workpiece with the annular lip of the centering cup means.

As just discussed, downward movement of the yoke means, and resulting opening movements of the jaw members 152, are effected by the helical spring means 196. Upward movement of the yoke means 192, and resulting closing movements of the jaw members 152, is accomplished by the admission of hydraulic fluid into a chamber 200 formed beneath the piston 194. Hydraulic fluid may be admitted into the chamber 200 through a bore 202 formed through the center of the piston and rod means 194, and the bore 202 can communicate with a fluid pressure line connected to the opening 203 and to one of the passageways 126 formed in the distributor disc 124 (see FIGS. 5 and 7) of the loader and transfer device.

Means for admitting and releasing hydraulic fluid to and from the chamber 200 may include conventional pumping and supply means associated with the machine control system. The control system provides for an admission and release of hydraulic fluid to and from the chamber 200 in accordance with a timed sequence and in accordance with whether a workpiece is to be gripped or released relative to the holding device.

Considering now the use and operation of the basic holding device shown in FIG. 10, it can be appreciated that when the holding device is in an unactivated condition, the jaw members 152 are in open positions because the spring 196 urges the yoke 192 downwardly. When it is desired to pick up a workpiece for transfer to another station, the arms 20 which carry the work-holding devices are rotated so that the work-holding devices are centered over the tops of workpieces to be picked up and transferred. Then, the loader assembly is activated to lower the arms for a contact and engagement of each work-holding device with each piece which is to be picked up.

Initially, each work-holding device contacts the workpiece by its centering pin 172, and the centering pin 172 assures a precise centering of the workpiece prior to contact by the centering cup 150 and the jaw members 152. This initial contact is made when the loader and transfer assembly 16 is activated to lower all arms, and continued lowering of the device brings all centering cups 150 into engagement with the tapered surfaces of all workpieces. Still further lowering of the arms and of the work-holding devices attached to the arms compresses each centering cup 150 upwardly towards its support block 158, and when the loader assembly reaches its lowermost position, the jaw members 152 can be activated to move radially inwardly to engage a heel 154 of the workpiece. The jaw members 152 are activated by introducing hydraulic fluid through the conduit 202 and into the chamber 200, thereby lifting the piston and rod assembly 194 and the yoke 192.

Separate spring means 204 are provided in channels formed in each of the jaw members 152 to bear against the pins 180 so as to normally urge the jaws downwardly in a direction which places each pin 180 at the uppermost limit of movement of its slot 186. Thus, when the jaw members 152 are initially moved by the admission of hydraulic fluid into chamber 200, they pivot about the pins 180 with the pins 180 being positioned at the upper ends of the jaw slots 186. The jaw members 152 move radially inwardly during this initial movement until they contact a heel portion of the workpiece or until they are stopped by limit pins 206. At that point continued application of fluid pressure in chamber 200 causes a continued lifting of the yoke 192, and since the jaws 152 can no longer move radially inwardly they are lifted upwardly by the yoke member by a movement of the elongate slots 186 relative to the fixed positions of the pins 180. Thus, the slots 186 provide for an initial pivoting movement of the jaws which moves them radially inwardly to contact a workpiece, and then, the jaws can be drawn upwardly to tightly engage and grip the workpiece against the centering cup 150. In addition, the provision of the elongate slots 186 for mounting the jaws on their respective pins 180 allows one jaw to move upwardly for a shorter distance than another, and this may happen when one of the jaw members engages a burr at its point of contact with the heel 154 of a workpiece.

After the jaws are fully gripped, the work loader and transfer device can be activated to lift all engaged workpieces upwardly out of their stations for movement to new stations. The work loader and transfer turret is rotated only when it is in an uppermost position, and then, it is lowered again to drop the workpieces into their new stations. When it is desired to release a workpiece from the grip of a work-holding device, fluid pressure is released from the chamber 200 by a control system, and the spring 196 presses the piston and rod assembly 194 downwardly. Since pins 180 of jaws 152 are near lowermost positions of the elongate slots 186, initial downward movement of the yoke 192 does not function to pivot the jaw members, but rather, it functions to move the jaw members axially downwardly for a short distance. Then, the jaws can pivot about the pins 180 to move radially outwardly away from the workpiece to release the workpiece from a gripping relationship with the centering cup 150. Then, the work loader and transfer turret can be lifted again and rotated in a reverse direction to place each work-holding device in a position to pick up pieces in a subsequent cycle.

The separate types of work-holding device shown in FIGS. 12 and 14 represents modifications of the basic device shown in FIG. 10. For purposes of manufacturing convenience, most of the elements of the separate handling devices are identical, but in the devices shown in FIGS. 12 and 14 additional mechanisms are provided for rotating a workpiece while it is being handled by the holding device.

The holding device which is shown in FIG. 12 includes one or more pin members 210 which are resiliently mounted in blocks carried by the cup 150 so as to enter the spiral grooves of a pinion gear piece which has been previously rough cut. The pin members 210 function to rotate the workpiece slightly while it is being contacted by the downward movement of the holding device, and it can be appreciated that downward movement of the pins 210 in a curved groove will effect a slight rotational movement of the workpiece. This type of holding device is used when work is being transferred from a conveyor or from a dummy station to a machine where finish cutting is to be effected. Such work is in a condition of having spiral grooves rough cut into its tapered surface. Since the individual workpieces which are carried in a conveyor are not oriented in any particular way, it is necessary to properly orient each workpiece about its vertical central axis so that the rough cut grooves are in proper orientation for being finish cut when they arrive at a cutting station.

The general operation of the work-holding device shown in FIG. 12 is one of moving the work loader and transfer device 16 downwardly so that the holding device of FIG. 12 can make contact with a rough cut piece at a source of supply or at a dummy station. During the downward movement of the work-holding device, the pins 210 enter spiral grooves at some point during their downward travel along the tapered surface of the gear piece, and then, continued downward movement of the holding device effects a final rotation of the workpiece which places each workpiece in the same angular position relative to the holding device. Then, the work loader and transfer device 16 is lifted and rotated to a new station, and the workpiece is lowered and released at the new station for a finish cutting operation.

Each of the pins 210 may be mounted in a bearing sleeve 212 carried in a block attached to the centering cup 150 so as to be easily movable along a central longitudinal axis of the pin. In addition spring means 214 are provided to normally urge the pins radially inwardly toward a workpiece. The view which is shown in FIG. 12 is distorted to the extent that portions of jaw members 152 are shown in the same plane as the centering pins. This is done to show all elements of the holding device, but in actual practice the jaw members 152 are angularly displaced around the center axis of the device so as to avoid interference with blocks supporting the pins 210.

Figure 13:
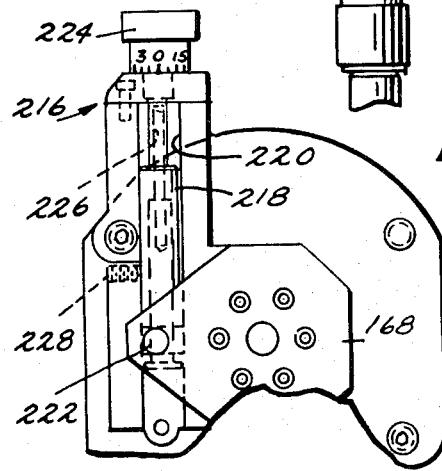
FIG. 13 is a plan view of a portion of the holding means of FIG. 12, illustrating a manually operated adjustment mechanism associated therewith.

FIG. 13 illustrates a means for manually adjusting the angular position of the holding device (H-2) of FIG. 12 in a loader arm generally indicated as 20. The manual adjustment means 216 includes a slide block 218 which can be moved longitudinally back and forth along a channel 220 formed within the support block 158. The slide block 218 includes an upwardly projecting shaft 222 which engages the top plate 168 to rotate the top plate and all elements attached to it. The top plate 168 has been modified for the FIG. 12 type of holding device to include recess means for receiving the projecting shaft 222 of the slide block. Movement of the slide block 218 is effected by turning a knob 224 to rotate a threaded shaft 226 relative to the slide block 218. The threaded shaft 226 is received within a threaded bore of the slide block 218, and very precise placement of the slide block 218 can be achieved. A locknut 228 may be provided for locking the slide block in any adjusted position. With the adjustment means 216 it is possible to rotate the position of the pins 210 so that they are positioned in a precise location for indexing a workpiece. An adjustment of the pin positions can be made by lowering the holding device of FIG. 12 over a properly placed workpiece at a cutting station and aligning the pins with the grooves of the workpiece.

The holding device (H-2) of FIG. 12 can be further modified to provide adjustment screws which limit the downward movement of the plate 168 relative to the support block 158 so that a precise downward limit for the centering cup 150 can be achieved. Since the pins 210 are carried by blocks mounted on the centering cup 150, it is important to set the exact level to which the pins 210 may move downwardly so that a known and precise degree of rotation for each workpiece will take place. By limiting the downward movement of the centering cup 150, it is necessary to allow each workpiece to drop for a short distance as it is being released from the grip of a holding device into a work spindle at a new station. This short distance of dropping of a workpiece assures a good seating of the workpiece in a spindle, and a final increment of rotation of the workpiece takes place by the action of the pins 210.

FIGS. 14 and 15 illustrate a third type of holding device (H-3) which may be utilized between two stations which operate to finish cut a pinion gear piece. In this type of operation, it is necessary to very precisely orient the workpiece after a first finish cut operation has been performed on it, and for such operation the type of structure shown in FIG. 12 is not sufficiently reliable to accurately place a workpiece at a second station for a second finish cutting operation. In addition, since one side of each gear tooth is already finish cut, it is desirable to avoid using any positioning pins (such as pins 210 in FIG. 12) which might possibly damage the finished surfaces of the gear. Of course, the workpiece is being moved by 120° from one station to another with a work loader and transfer device of the type shown in FIG. 2 wherein each of the arms 32, 34 and 36 is placed 120° apart from the others. However, the 120° displacement of a workpiece from one station to the next is not sufficient to precisely position the previously cut piece relative to a second cutter at the second station. The work-holding device of FIG. 14 is constructed to provide for a carefully adjusted rotation of a workpiece while it is being transferred from one station to another.

Basically, the work-holding device (H-3) of FIG. 14 includes the same centering cup and jaw-actuating mechanism as described for FIGS. 10 and 12, and in addition, there is provided a means for automatically rotating the top plate 168 relative to the support block 158 carried by the arm 32. In the FIG. 14 embodiment, the support block 158 has a reduced diameter end portion 232 which is sufficiently small to allow downwardly depending pins 234 and 236 to move around it. The pins 234 and 236 are fixed to the top plate 168. A spring biased shaft 234 and 236 are fixed to the top plate 168. A spring biased shaft 238 is carried within a cylindrical structure affixed to a portion of the support block 158 or of the arm 32 so that the shaft 238 can move in and out of the cylindrical structure 240. A spring 242 is compressed within the cylindrical structure 240 to bear against an enlarge end 244 of the shaft 238 so as to urge the shaft 238 against the pin 234. Thus, it can be seen that the rod 238 normally functions to rotate the plate 168 in a counterclockwise direction as viewed in FIG. 16.

Counterclockwise movement of the plate 168 is limited by an upstanding pin 246 fixed into the support block end portion 232. The plate 168 is formed within a reduced diameter portion at 248 to permit limited rotation of the plate 168 relative to the stop pin 246. Rotation of the top plate in a clockwise direction is achieved by moving a rod 250 against the pin 236. The rod 250 is fitted within a bore so as to function as a piston when hydraulic fluid is introduced into the chamber 252 by way of a conduit 254. The conduit 254 is preferably placed externally of the arm structure 32 and receives an admission and release of hydraulic fluid at the same time as passageway 202 associated with actuation of the jaw member of the holding device.

Thus, when the passageways 202 and 254 are pressurized with hydraulic fluid from a source, the jaw members 152 are locked into a gripping engagement with a workpiece, and the pressure of fluid in the chamber 252 attempts to rotate the entire work-holding device relative to the workpiece. However, normal sequencing of a work transfer operation requires that a workpiece be held in its work spindle in a chucked condition until full engagement of the jaws 152 has been accomplished. Then, the workpiece is dechucked from its work spindle, and the work-holding device is rotated by movement of the rod 250 as the entire turret assembly of the work loader and transfer means is being lifted away from the station where the workpiece is received.

The amount of clockwise rotation movement of the plate 168, and all of the work-holding elements attached thereto, is limited by a stop nut 256 carried at a trailing end of a small diameter rod 258 which is threaded into a central bore of the piston rod 250. A cylindrical dial member 260 can be rotated relative to its supporting sleeve 262 to effect a threading and unthreading of the small diameter rod 258 into and out of the piston rod 250. The dial 260 is operatively connected to the rod 258 by a pin 264 which rides in a slot formed along the length of rod 258, and thus all turning movements of the dial 260 result in axial movements of the piston rod 250. The piston rod is prevented from turning by a pin 265 which rides in a slot formed into the surface of the piston rod. When it is desired to adjust the length of stroke of the piston rod 250, hydraulic pressure is applied to the chamber 252 so that the piston rod 250 moves tightly against the pin 236. Then, the dial 260 is rotated to advance or retract the actual position of the end of the piston rod 250 to change the position of the pin 236, and this adjustment can be made in accordance with readings provided by instruments attached to a machine or in accordance with known placements of workpieces at a work station.

Once the desired adjustment is accomplished, hydraulic fluid can be released from the chamber 252, and at that point the spring 242 of the opposing rod 238 will urge the plate 168 in a counterclockwise direction which will move the piston rod 250 back into its bore until the plate 168 contacts the pin 246 at 266. This will cause the rod 258 to move to the right, as seen in FIG. 14 and a gap will appear between the stop nut 256 and the shoulder of the dial member 260. The gap which appears corresponds to the amount of movement which has been set for the piston rod 250 when hydraulic fluid is once again introduced into the chamber 252.

The shoulder 268 on the plate 168 does not function as a limit which engages the pin 246 and is only designed to provide sufficient clearance for all contemplated adjustments of rotation for the plate 168. A setscrew 270 may be provided in the supporting sleeve 262 to set the rotational position of the dial 260 and of the rod 258 once a desired setting has been achieved.

The type of holding device which is shown in FIG. 14 also includes a slight modification in the centering cup 150. The centering cup 150 is provided with a number of spring urged pins 272 which have sharpened points for contacting and indenting the surface of a workpiece to fix the position of the workpiece relative to the entire work-holding structure. This additional feature is provided because of the precision that is required in rotating the work-holding device, and it is important to make sure that the workpiece does not move relative to the work-holding device while rotation of the workpiece is taking place. Thus, it can be seen that means have been disclosed in the FIG. 14 embodiment to provide an automatic stock division of work while a workpiece is being transferred from one station to another and this stock division indexing can be achieved with great precision.

FIG. 16 illustrates structure associated with a conveyor 26 which moves work blanks and workpieces into and out of a third station associated with a cutting arrangement of the type shown in FIG. 2. A workpiece 500 is shown being contacted by a lifting mechanism 502 which includes a spindle 504 actuated by a piston and rod assembly 506. Springs 508 normally urge the lifting assembly downwardly, but hydraulic fluid can be admitted in the chamber 510 to lift the workpiece into a position where it can be received by the jaw members of a holding device of the loader and transfer means 16.

What is claimed is:

1. In apparatus for transferring bevel gear workpieces having tapered tooth portions from one station to another, the improvement in holding means for bevel gear workpieces, comprising:
   centering cup means for contacting the tapered tooth portion of a bevel gear piece which is oriented with its heel end lowermost to the remainder of said portion,
   at least two jaw members articulated relative to a main body portion of said work-holding means to move radially and vertically relative to centering cup means, said jaw members being of a configuration to engage said heel end of said bevel gear piece between the centering cup means and the jaw members, and
   actuating means to move jaw members radially about a fixed pivot pin in response to vertical movements of a yoke means connected to a lever end of each jaw member, each said jaw member further being mounted for limited vertical movement relative to said fixed pivot pin so that said actuating means operates to move said jaw members (a) radially into engagement with a workpiece and (b) vertically to draw the workpiece into said centering cup means.

2. The apparatus of claim 1 wherein said actuating means includes a hydraulically operated piston means connected to said yoke means.

3. The apparatus of claim 2 and including a resilient means to urge said piston means in a direction which will release said jaw members.

4. The apparatus of claim 2 wherein said actuating means includes (a) resilient means for urging said jaw members vertically to release a workpiece from said centering cup means, and (b) releasable pressure applying means for effecting opposite vertical motion and radial motion of the jaw members into engageable relation with a workpiece.

5. The apparatus of claim 1, and including means for rotating a bevel gear piece contacted by said holding means to effect a stock division of said workpiece.

6. The apparatus of claim 5 wherein said rotating means includes a pin means carried by the centering cup means, said pin means functioning to rotate a bevel gear piece as it rides within a spiral groove of the bevel gear during vertical movements of the centering cup means.

7. The apparatus of claim 5, wherein said rotating means comprises means to rotate the holding means relative to a loader and transfer means to which said holding means is attached.

* * * * *